United States Patent
Chuong et al.

(10) Patent No.: US 11,415,227 B2
(45) Date of Patent: Aug. 16, 2022

(54) NON-CONTACT SEAL ASSEMBLY WITH CHAMFERED SEAL SHOE

(71) Applicant: United Technologies Corporation, Farmington, CT (US)

(72) Inventors: Conway Chuong, Manchester, CT (US); Tara D'Ambruoso, Oxford, CT (US); Michael L. DiFrancesco, Waterbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 301 days.

(21) Appl. No.: 16/546,761

(22) Filed: Aug. 21, 2019

(65) Prior Publication Data

US 2021/0054937 A1 Feb. 25, 2021

(51) Int. Cl.
  *F16J 15/44* (2006.01)
  *F01D 11/02* (2006.01)
  *F01D 11/16* (2006.01)
  *F02C 7/28* (2006.01)

(52) U.S. Cl.
  CPC ........... *F16J 15/442* (2013.01); *F01D 11/025* (2013.01); *F01D 11/16* (2013.01); *F16J 15/445* (2013.01); *F02C 7/28* (2013.01); *F05D 2240/55* (2013.01)

(58) Field of Classification Search
  CPC .......... F16J 15/442; F16J 15/441; F01D 5/02; F01D 11/025; F01D 11/12; F01D 11/16; F05B 2240/57; F05D 2240/55
  See application file for complete search history.

(56) References Cited

U.S. PATENT DOCUMENTS

| | | | |
|---|---|---|---|
| 4,017,088 A * | 4/1977 | Lerjen | F16J 15/441 277/416 |
| 7,410,173 B2 * | 8/2008 | Justak | F01D 11/00 277/355 |
| 7,896,352 B2 * | 3/2011 | Justak | F16J 15/442 277/411 |
| 8,002,285 B2 * | 8/2011 | Justak | F16J 15/442 277/412 |
| 8,162,323 B2 | 4/2012 | Nicholson et al. | |
| 8,172,232 B2 * | 5/2012 | Justak | F16J 15/442 277/411 |
| 8,641,045 B2 * | 2/2014 | Justak | F01D 11/025 277/412 |

(Continued)

OTHER PUBLICATIONS

EP search report for EP20179075.5 dated Oct. 29, 2020.

*Primary Examiner* — Eugene G Byrd
(74) *Attorney, Agent, or Firm* — Getz Balich LLC

(57) ABSTRACT

An assembly is provided for rotational equipment. The assembly includes a plurality of seal shoes, a seal base and a plurality of spring elements. The seal shoes are arranged around an axis in an annular array. The seal shoes include a first seal shoe. The seal base circumscribes the annular array of seal shoes. The spring elements include a first spring element. The first spring element is radially between and connects the first seal shoe and the seal base. The first seal shoe extends circumferentially about the axis between a first end and a second end. The first seal shoe extends radially between an inner side and an outer side. The first seal shoe is configured with a chamfered corner at an interface between the first end and the inner side.

20 Claims, 12 Drawing Sheets

(56) References Cited

U.S. PATENT DOCUMENTS

| | | | |
|---|---|---|---|
| 8,919,781 B2 * | 12/2014 | Justak | F16J 15/442 |
| | | | 277/411 |
| 9,045,994 B2 * | 6/2015 | Bidkar | F16J 15/442 |
| 9,115,810 B2 * | 8/2015 | Bidkar | F16J 15/442 |
| 9,587,746 B2 * | 3/2017 | Bidkar | F16J 15/445 |
| 9,677,669 B2 | 6/2017 | Uehara et al. | |
| 10,030,531 B2 * | 7/2018 | Peters | F01D 9/02 |
| 10,094,241 B2 | 10/2018 | Ackermann et al. | |
| 10,100,657 B2 | 10/2018 | Chuong | |
| 10,107,126 B2 | 10/2018 | Ackermann et al. | |
| 10,184,347 B1 | 1/2019 | D'Ambruoso | |
| 2003/0080513 A1 * | 5/2003 | Kirby, III | F16J 15/441 |
| | | | 277/416 |
| 2008/0265513 A1 * | 10/2008 | Justak | F01D 11/025 |
| | | | 277/301 |
| 2014/0008871 A1 * | 1/2014 | Bidkar | F04D 29/164 |
| | | | 277/303 |
| 2016/0010480 A1 | 1/2016 | Bidkar | |
| 2016/0102570 A1 * | 4/2016 | Wilson | F16F 15/06 |
| | | | 277/411 |
| 2016/0130963 A1 * | 5/2016 | Wilson | F01D 11/025 |
| | | | 60/805 |
| 2017/0009596 A1 | 1/2017 | Schwarz et al. | |
| 2017/0051751 A1 | 2/2017 | Ackermann et al. | |
| 2017/0226883 A1 * | 8/2017 | Peters | F01D 5/02 |
| 2017/0335972 A1 * | 11/2017 | Mahieux | F04B 39/042 |
| 2018/0045066 A1 | 2/2018 | Chuong | |
| 2018/0058240 A1 * | 3/2018 | Chuong | F04D 29/083 |
| 2019/0017403 A1 | 1/2019 | Chuong et al. | |
| 2019/0017606 A1 | 1/2019 | Chuong | |
| 2019/0017607 A1 | 1/2019 | Chuong et al. | |

\* cited by examiner

NON-CONTACT SEAL ASSEMBLY WITH CHAMFERED SEAL SHOE

This invention was made with Government support awarded by the United States. The Government has certain rights in this invention.

BACKGROUND OF THE DISCLOSURE

1. Technical Field

This disclosure relates generally to rotational equipment and, more particularly, to a seal assembly for sealing a gap between a stationary component and a rotating component.

2. Background Information

Rotational equipment such as a gas turbine engine includes various seal assemblies for sealing gaps between stationary components and rotating components. Various types and configurations of seal assemblies are known in the art. While these known seal assemblies have various advantages, there is still room in the art for improvement.

SUMMARY OF THE DISCLOSURE

According to an aspect of the present disclosure, an assembly is provided for rotational equipment. This assembly includes a plurality of seal shoes, a seal base and a plurality of spring elements. The seal shoes are arranged around an axis in an annular array. The seal shoes include a first seal shoe. The seal base circumscribes the annular array of seal shoes. The spring elements include a first spring element. The first spring element is radially between and connects the first seal shoe and the seal base. The first seal shoe extends circumferentially about the axis between a first end and a second end. The first seal shoe extends radially between an inner side and an outer side. The first seal shoe is configured with a chamfered corner at an interface between the first end and the inner side.

According to another aspect of the present disclosure, another assembly is provided for rotational equipment. This assembly includes a plurality of seal shoes, a seal base and a plurality of spring elements. The seal shoes are arranged around an axis and include a first seal shoe. The seal base extends circumferentially around the plurality of seal shoes. The spring elements includes a first spring element. The first spring element is radially between and engaged with the first seal shoe and the seal base. The first seal shoe includes a first end surface, a second end surface, an inner surface, an outer surface and a corner surface. The first seal shoe extends circumferentially about the axis between the first end surface and the second end surface. The first seal shoe extends radially between the inner surface and the outer surface. The corner surface extends between the inner surface and the first end surface.

Each of the first spring elements may be radially between and engaged with a respective one of the seal shoes and the seal base.

The rotational equipment may be configured as or otherwise include a gas turbine engine.

The corner surface may be angularly offset from the inner surface by an obtuse included angle. In addition or alternatively, the corner surface may at least partially form a chamfered corner of the first seal shoe.

The chamfered corner may be configured from or otherwise include a corner surface. The corner surface may be angularly offset from an inner surface of the first seal shoe at the inner side by an angle when viewed in a plane perpendicular to the axis. This angle may be an obtuse included angle.

The inner surface may have an arcuate sectional geometry.

The angle may be equal to or greater than one hundred and thirty-five degrees. The angle may also or alternatively be less than one hundred and eighty degrees.

The chamfered corner may be configured from or otherwise include a corner surface. The corner surface may be angularly offset from an end surface of the first seal shoe at the first end by an angle when viewed in a plane perpendicular to the axis. This angle may be an obtuse included angle.

The end surface may have a straight sectional geometry.

The first seal shoe may include a base and a plurality of rails arranged in parallel at discrete axial locations along the axis. Each of the plurality of rails may project radially inwards from the base to the inner side. The chamfered corner may be formed by one or more or each of the plurality of rails.

The assembly may also include a rotating structure configured to rotate counter-clockwise about the axis when viewed in in a plane perpendicular to the axis. When viewed in the plane, the first end may be a left side end of the first seal shoe and the second end may be a right side end of the first seal shoe.

The first seal shoe may be configured with a second chamfered corner at an interface between the second end and the inner side.

An end surface of the first seal shoe at the second end and an inner surface of the first seal shoe at the inner side may meet at a sharp corner.

The first spring element may include a first mount, a second mount and a spring beam. The first mount may be connected to and project radially outward from the first seal shoe. The second mount may be connected to and project radially inward from the seal base. The spring beam may extend laterally between and may be connected to the first mount and the second mount.

The first mount may be disposed at the first end of the first seal shoe.

The first mount may be disposed at the second end of the first seal shoe.

The first spring element may further include a second spring beam extending laterally between and connected to the first mount and the second mount.

The assembly may also include a non-contact seal assembly that includes the seal shoes, the seal base and the spring elements.

At least the seal shoes, the seal base and the spring elements may be configured together in a monolithic body.

The assembly may also include a stationary structure, a rotating structure and a seal assembly. The rotating structure may be configured to rotate about the axis. The seal assembly may include the plurality of seal shoes, the seal base and the plurality of spring elements. The seal assembly may be configured to seal a gap between the stationary structure and the rotating structure. The plurality of seal shoes may be arranged circumferentially about and sealingly engage the rotating structure. The seal base may be mounted to the stationary structure.

The foregoing features and the operation of the invention will become more apparent in light of the following description and the accompanying drawings.

DETAILED DESCRIPTION

Figure 1:
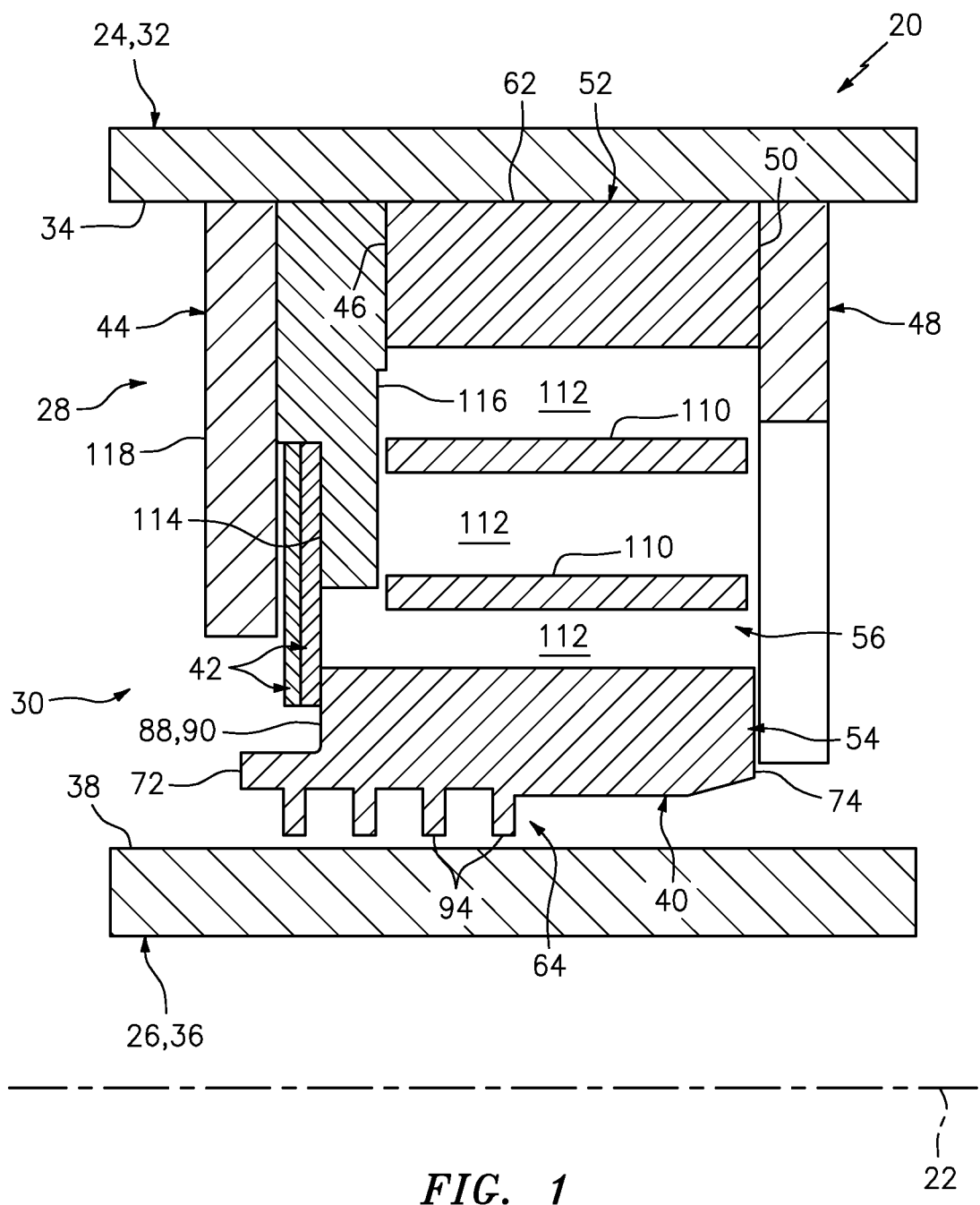
FIG. 1 is a partial side sectional illustration of an assembly for rotational equipment.

FIG. 1 illustrates an assembly 20 for rotational equipment with an axial centerline 22, which centerline 22 may also be an axis of rotation (e.g., a rotational axis) for one or more components of the assembly 20. An example of such rotational equipment is a gas turbine engine for an aircraft propulsion system, an exemplary embodiment of which is described below in further detail. However, the assembly 20 of the present disclosure is not limited to such an aircraft or gas turbine engine application. The assembly 20, for example, may alternatively be configured with rotational equipment such as an industrial gas turbine engine, a wind turbine, a water turbine or any other apparatus in which a seal is provided between a stationary structure and a rotating structure; e.g., a rotor.

The assembly 20 of FIG. 1 includes a stationary structure 24, a rotating structure 26 and a seal assembly 28; e.g., a non-contact seal assembly. The seal assembly 28 is mounted with the stationary structure 24 and configured to substantially seal an annular gap 30 between the stationary structure 24 and the rotating structure 26 as described below in further detail.

The stationary structure 24 includes a seal carrier 32. This seal carrier 32 may be a discrete, unitary annular body. Alternatively, the seal carrier 32 may be configured with another component/portion of the stationary structure 24. The seal carrier 32 has a seal carrier inner surface 34. This inner surface 34 may be substantially cylindrical. The inner surface 34 extends circumferentially about (e.g., completely around) and faces towards the axial centerline 22. The inner surface 34 at least partially forms a bore in the stationary structure 24. This bore is sized to receive the seal assembly 28, which may be fixedly attached to the seal carrier 32 by, for example, a press fit connection between the seal assembly 28 and the inner surface 34. The seal assembly 28, of course, may also or alternatively be fixedly attached to the seal carrier 32 using one or more other techniques/devices.

The rotating structure 26 includes a seal land 36. This seal land 36 may be a discrete, unitary annular body. For example, the seal land 36 may be mounted to a shaft of the rotating structure 26. Alternatively, the seal land 36 may be configured with another component/portion of the rotating structure 26. For example, the seal land 36 may be an integral part of a shaft of the rotating structure 26, or another component mounted to the shaft.

The seal land 36 of FIG. 1 has an outer seal land surface 38. This seal land surface 38 may be substantially cylindrical. The seal land surface 38 extends circumferentially about (e.g., completely around) and faces away from the axial centerline 22. The seal land surface 38 is disposed to face towards and is axially aligned with the seal carrier inner surface 34. While FIG. 1 illustrates the seal land surface 38 and the seal carrier inner surface 34 with approximately equal axial lengths along the axial centerline 22, the seal land surface 38 may alternatively be longer or shorter than the seal carrier inner surface 34 in other embodiments.

The seal assembly 28 includes a primary seal device 40 and one or more secondary seal devices 42. The seal assembly 28 also includes one or more additional components for positioning, supporting and/or mounting one or more of the seal devices with the stationary structure 24. The seal assembly 28 of FIG. 1, for example, includes a first ring structure 44 configured for positioning, supporting and/or mounting the secondary seal devices 42 relative to the primary seal device 40. This first ring structure 44 may also be configured for axially positioning and/or supporting an axial first side surface 46 of the primary seal device 40 relative to the stationary structure 24. The seal assembly 28 of FIG. 1 also includes a second ring structure 48 (e.g., a scalloped support ring/plate) configured for axially positioning and/or supporting an axial second side surface 50 of the primary seal device 40 relative to the stationary structure 24. However, the second ring structure 48 may be omitted where, for example, the second side surface 50 of the primary seal device 40 is abutted against another component/portion of the stationary structure 24 (e.g., an annular or castellated shoulder) or otherwise axially positioned/secured with the stationary structure 24.

Figure 2:
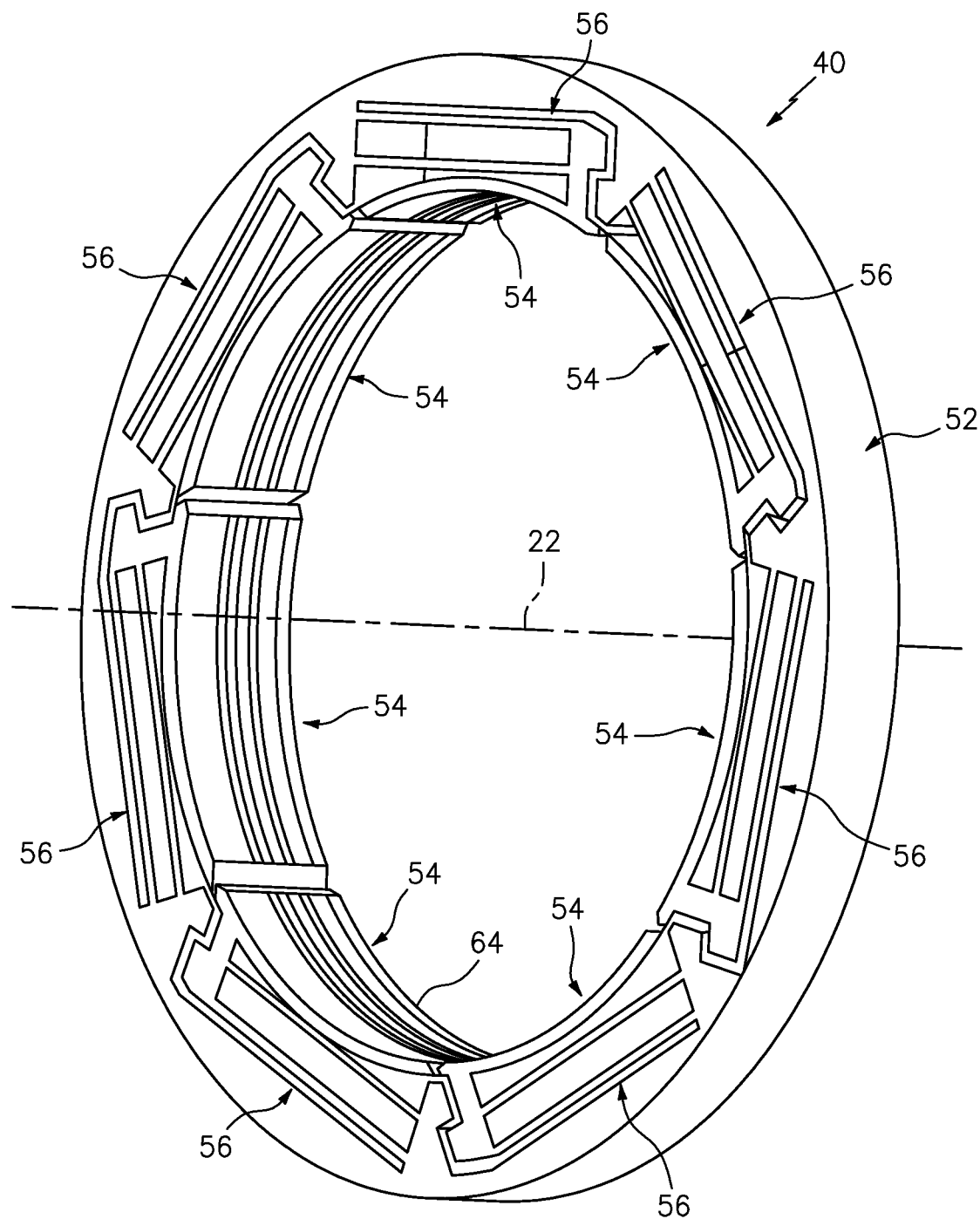
FIG. 2 is a perspective illustration of a primary seal device of a non-contact seal assembly.

Referring to FIG. 2, the primary seal device 40 is configured as an annular (e.g., non-contact) seal device such as, but not limited to, a non-contact hydrostatic (e.g., hydrodynamic) seal device. The primary seal device 40 includes a seal base 52, a plurality of seal shoes 54, a plurality of spring elements 56 (see also FIGS. 3 and 4).

Figure 3:
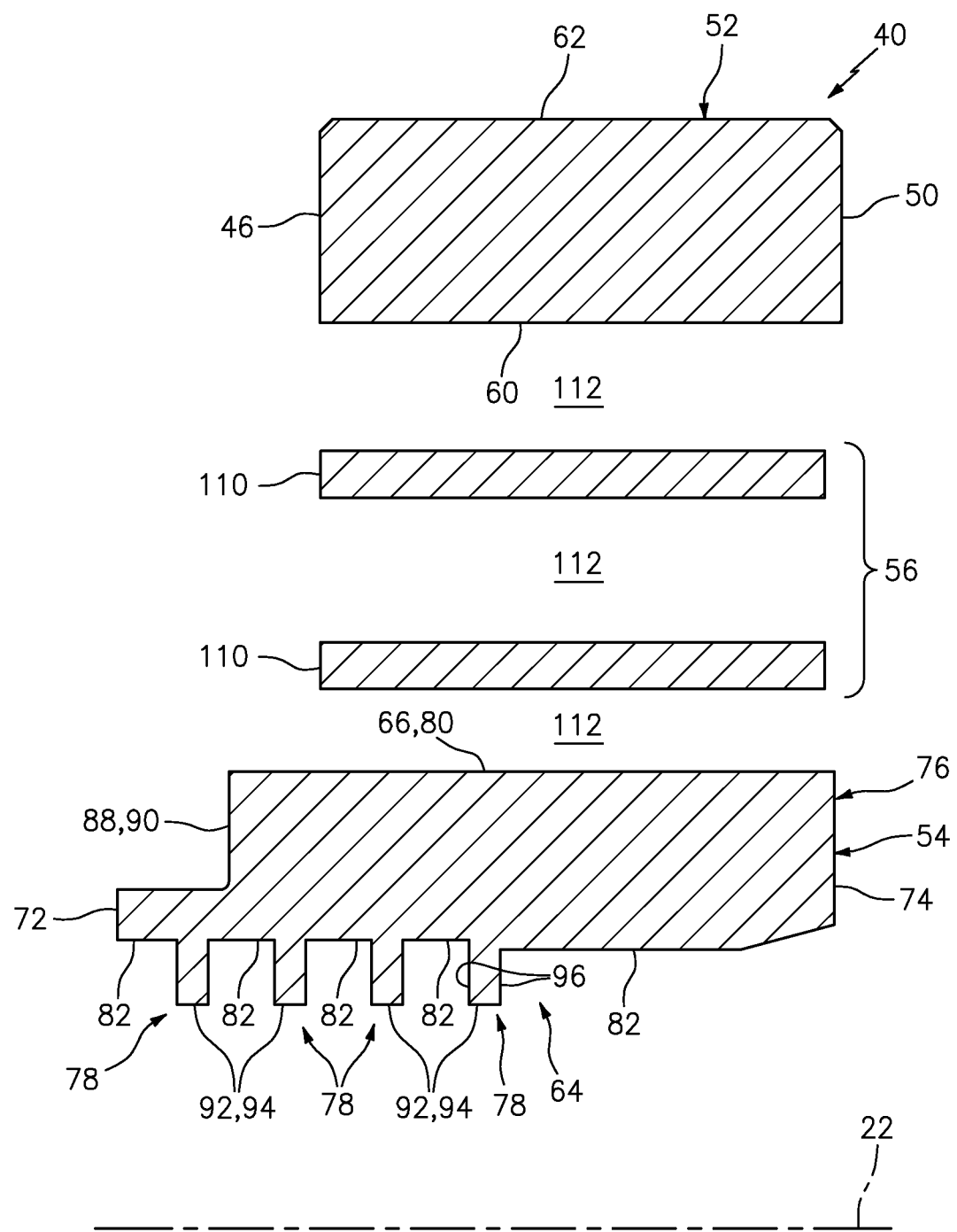
FIG. 3 is a partial side sectional illustration of the primary seal device.

The seal base 52 may be configured as an annular full hoop body. The seal base 52 of FIG. 2 extends circumferentially about (e.g., completely around) the axial centerline 22. The seal base 52 is configured to extend circumferentially around and thereby circumscribe and support the seal shoes 54 as well as the spring elements 56. Referring to FIG. 3, the seal base 52 extends axially along the axial centerline 22 between and forms the axial first side surface 46 and the second side surface 50. The seal base 52 extends radially between a seal base inner side 60 and a seal base outer side 62. The seal base outer side 62 radially engages (e.g., is press fit against or otherwise contacts) the stationary structure 24 and its inner surface 34 as shown in FIG. 1.

Referring to FIG. 2, the seal shoes 54 are configured as arcuate bodies and arranged circumferentially around the axial centerline 22 in an annular array. Each seal shoe 54, for example, is arranged circumferentially between and next to a pair of adjacent circumferentially neighboring seal shoes 54. The annular array of the seal shoes 54 extends circumferentially around the axial centerline 22, thereby forming an inner bore at an inner side 64 of the primary seal device 40. As best seen in FIG. 1, the inner bore is sized to receive the seal land 36, where the rotating structure 26 projects axially through (or into) the inner bore formed by the seal shoes 54.

Figure 4:
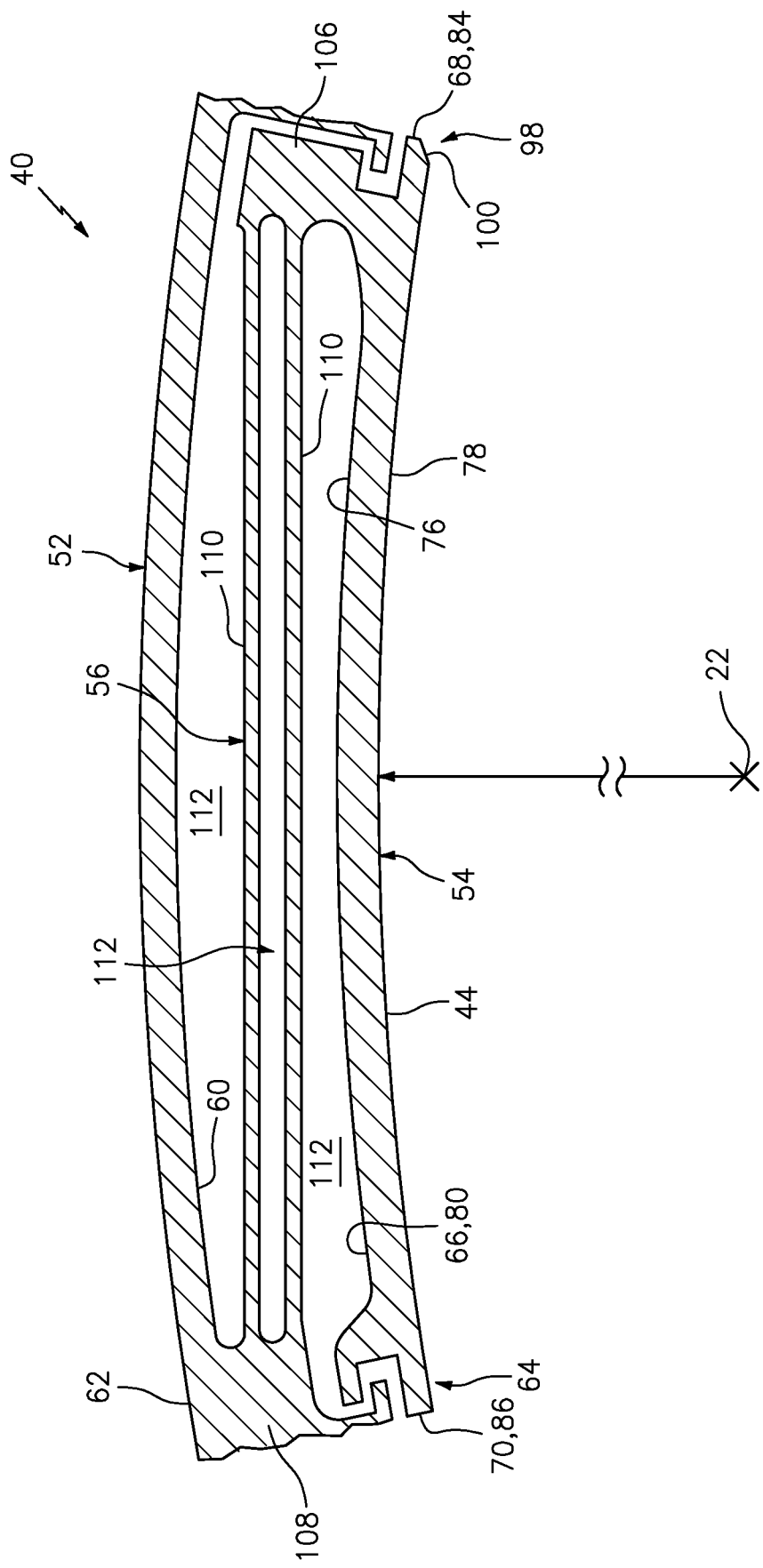
FIG. 4 is a sectional illustration of a section of the primary seal device.

Referring to FIG. 4, each of the seal shoes 54 extends radially from the inner side 64 of the primary seal device 40 to an outer side 66 of that seal shoe 54. Each of the seal shoes 54 extends circumferentially about the axial centerline 22 between opposing first and second ends 68 and 70 of that seal shoe 54. Referring to FIG. 3, each of the seal shoes 54 extends axially along the axial centerline 22 between a first side 72 and a second side 74 of the seal shoe. The seal shoe first side 72 may be axially offset from and project axially away from the axial first side surface 46. The seal shoe second side 74 may be axially aligned with the second side surface 50. The seal shoes 54 of the present disclosure, however, are not limited to such exemplary relationships.

Each of the seal shoes 54 includes a seal shoe base 76 and one or more seal shoe protrusions 78; e.g., rails/teeth. The seal shoe base 76 is disposed at (e.g., on, adjacent or proximate) the seal shoe outer side 66. The seal shoe base 76 of FIG. 4, for example, includes a (e.g., arcuate) base outer surface 80 at the outer side 66. Referring to FIG. 3, the seal shoe base 76 extends radially between the base outer surface 80 and one or more (e.g., arcuate) base inner surfaces 82. Each of these base inner surfaces 82 may be an arcuate surface. Referring to FIG. 4, the seal shoe base 76 extends circumferentially about the axial centerline 22 between the seal shoe first end 68 and the seal shoe second end 70. The seal shoe base 76 includes a first end surface 84 at the seal shoe first end 68 and a second end surface 86 at the seal shoe second end 70. Each of the end surfaces 84, 86 may be a flat planar surface. Each of the end surfaces 84, 86, for example, may have a straight sectional geometry when viewed, for example, in a plane perpendicular to the axial centerline 22; e.g., the plane of FIG. 4. Referring to FIG. 3, the seal shoe base 76 extends axially between the seal shoe first side 72 and the seal shoe second side 74.

The seal shoe base 76 includes a (e.g., arcuate) side surface 88 generally at the seal shoe first side 72. In the array, these side surfaces 88 collectively form a generally annular, but circumferentially segmented, side surface 90 configured for sealingly engaging with (e.g., contacting) the secondary seal devices 42 as shown in FIG. 1. The seal shoes 54 of the present disclosure, however, are not limited to the foregoing exemplary configuration.

Referring to FIG. 3, the seal shoe protrusions 78 are arranged at discrete axial locations along the axial centerline 22 and the seal shoe base 76. Each pair of axially adjacent/neighboring protrusions 78 may thereby be axially separated by an (e.g., arcuate) inter-protrusion gap. The seal shoe protrusions 78 of FIG. 3 (see also FIG. 2) are configured parallel to one another.

The seal shoe protrusions 78 are connected to (e.g., formed integral with or otherwise attached to) the seal shoe base 76. Each of the seal shoe protrusions 78 projects radially inwards from the seal shoe base 76 and its base inner surfaces 82 to a distal protrusion end 92.

Each of the seal shoe protrusions 78 has a protrusion inner surface 94 at the distal protrusion end 92. One or more or each of the protrusion inner surfaces 94 may also be at the inner side 64 of the primary seal device 40. Each protrusion inner surface 94 may be an arcuate surface. Each protrusion inner surface 94, for example, may have an arcuate sectional geometry when viewed, for example, in a plane perpendicular to the axial centerline 22; e.g., the plane of FIG. 4. The protrusion inner surfaces 94 are configured to be arranged in close proximity with (but not touch) and thereby sealingly mate with the seal land surface 38 in a non-contact manner (see FIG. 1), where the rotating structure 26 projects axially through (or into) the inner bore formed by the seal shoes 54.

Each of the seal shoe protrusions 78 extends axially between opposing protrusion end surfaces 96. Each of these end surfaces 96 extends radially between and may be contiguous with a respective one of the protrusion inner surfaces 94 and a respective one of the base inner surfaces 82.

Each of the seal shoe protrusions 78 of FIG. 3 has the same radial height. In other embodiments, however, one or more of the seal shoe protrusions 78 may have a different radial height than at least another one of the seal shoe protrusions 78.

Figure 5:
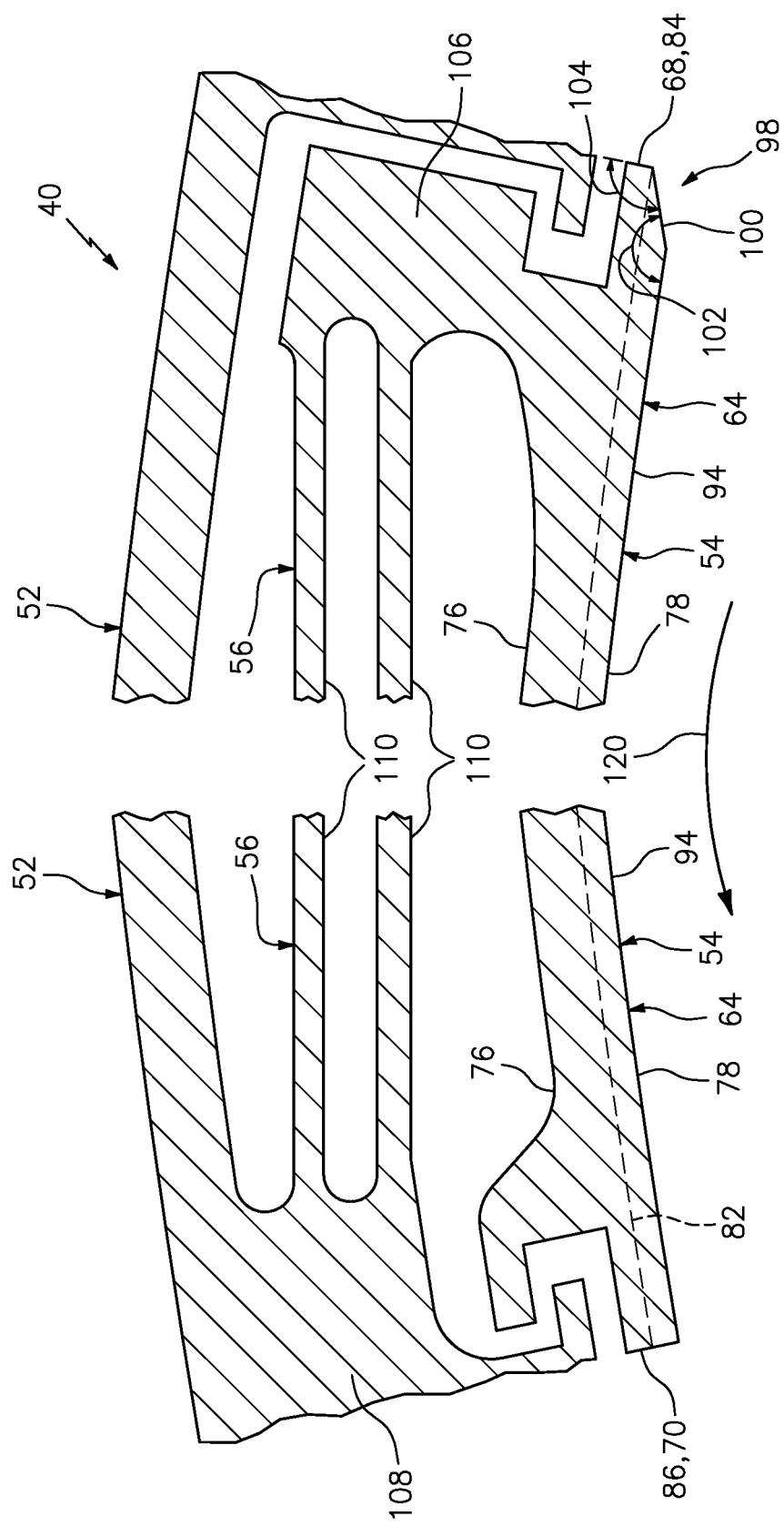
FIG. 5 is a partial segmented sectional illustration of the primary seal device section of FIG. 4.
Figure 6:
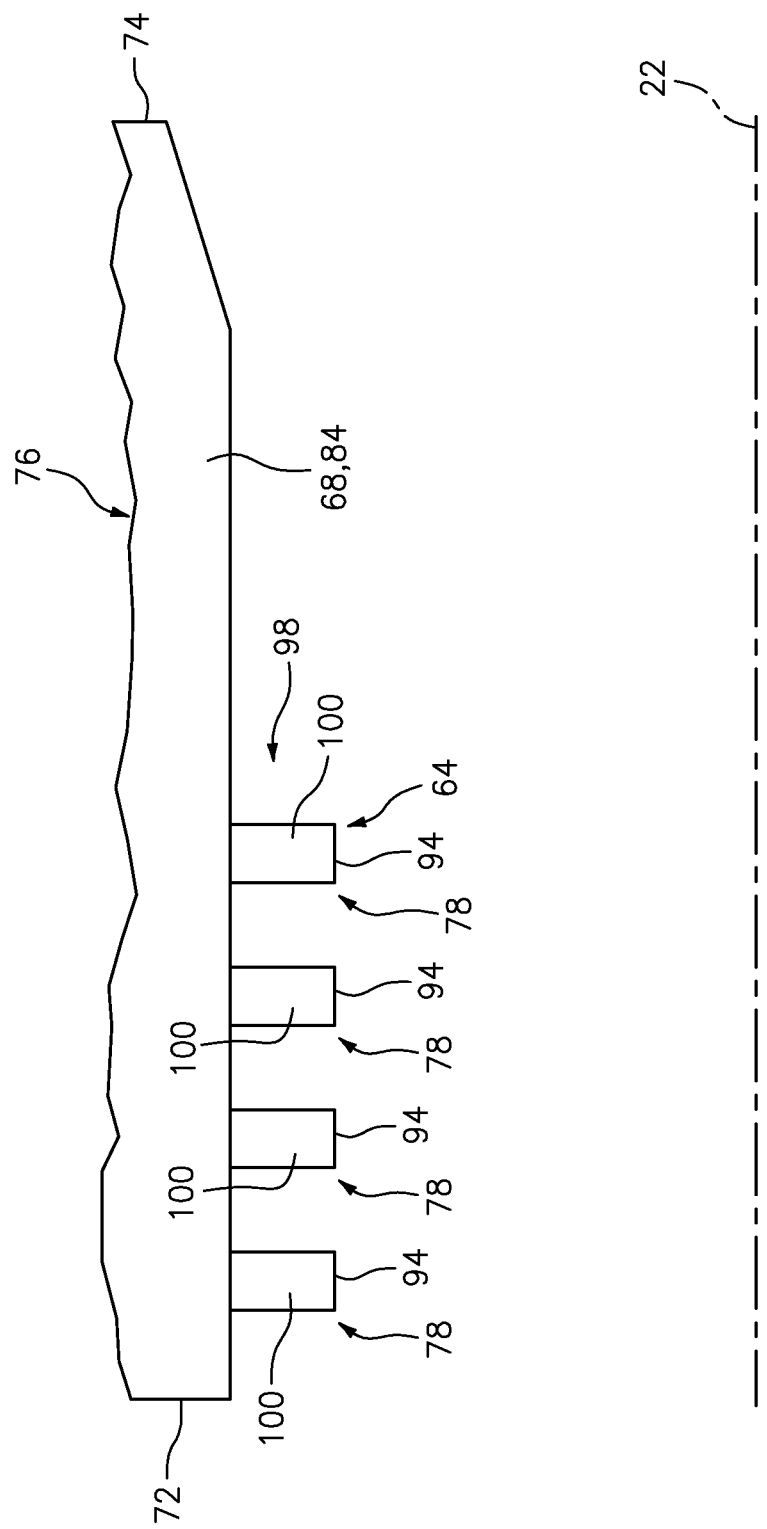
FIG. 6 is a partial end view illustration of a seal shoe.

Referring to FIG. 5, one or more or each of the seal shoes 54 is configured with at least one chamfered corner 98. The chamfered corner 98 of FIG. 5 is located at an interface between the seal shoe first end 68 and the inner side 64 of the primary seal device 40. The chamfered corner 98 of FIGS. 5 and 6, for example, includes/is formed by one or more corner (e.g., chamfer) surfaces 100. Each of these corner surfaces 100 is formed by/carried by at least one of the seal shoe protrusions 78. Each of the corner surfaces 100 extends between and may be contiguous with a respective one of the protrusion inner surfaces 94 and the first end surface 84.

Each of the corner surfaces 100 of FIG. 5 is angularly offset from the respective protrusion inner surface 94 by an angle 102 when viewed, for example, in a plane perpendicular to the axial centerline 22; e.g., plane of FIG. 5. This angle 102 may be an obtuse included angle. The angle 102, for example, may be equal to or greater than one hundred and thirty-five degrees (135°) and less than one hundred and eighty degrees (180°). More specifically, the angle 102 may be equal to or greater than one hundred and fifty degrees (150°) and less than or equal to one hundred and seventy-five degrees (175°). The present disclosure, of course, is not limited to such exemplary angle values. For example, in other embodiments, the angle 102 may be any angle greater than ninety degrees (90°) and less than one hundred and eighty degrees (180°).

Each of the corner surfaces 100 of FIG. 5 is angularly offset from the first end surface 84 by an angle 104 when viewed, for example, in a plane perpendicular to the axial centerline 22; e.g., plane of FIG. 5. This angle 104 may be an obtuse included angle. The angle 104, for example, may be greater than ninety degrees (90°) and less than or equal to one hundred and thirty-five degrees (135°). The present disclosure, of course, is not limited to such exemplary angle values. For example, in other embodiments, the angle 104 may be any angle greater than ninety degrees (90°) and less than one hundred and eighty degrees (180°).

Each of the surfaces 82, 94 may meet the surface 86 at the base second end 70 at a relatively sharp corner; e.g., an edge. For example, the surfaces 82 and/or 94 may each be contiguous with and approximately (e.g., +/−5°) perpendicular to the surface 86.

Referring to FIG. 2, the spring elements 56 are arranged circumferentially about the axial centerline 22 in an annular array. Referring to FIGS. 3 and 4, the spring elements 56 are also arranged radially between the seal shoes 54 and the seal base 52. Each of the spring elements 56 is configured to movably and resiliently connect a respective one of the seal shoes 54 to the seal base 52.

The spring element 56 of FIG. 4 includes first and second mounts 106 and 108 (e.g., radial fingers/projections) and one or more spring beams 110. The first mount 106 is connected to a respective one of the seal shoes 54 at (e.g., on, adjacent or proximate) the base first end 68, where the opposing base second end 70 is free floating (e.g., the seal shoe 54 is cantilevered from the first mount 106). The first mount 106 projects radially outward from the seal shoe base 76. The second mount 108 is connected to the seal base 52, and is generally circumferentially aligned with or near the base second end 70. The second mount 108 is therefore disposed a circumferential distance from the first mount 106. The second mount 108 projects radially inward from the seal base 52.

The spring beams 110 are configured as resilient, biasing members of the primary seal device 40. The spring beams 110 of FIG. 4, for example, are configured as cantilevered-leaf springs. These spring beams 110 are radially stacked and spaced apart from one another so as to form a four bar linkage with the first mount 106 and the second mount 108. More particularly, each of the spring beams 110 is connected to the first mount 106 and the second mount 108. Each of the spring beams 110 extends laterally (e.g., circumferentially or tangentially) between and to the first mount 106 and the second mount 108. The spring beams 110 of FIG. 4 may thereby laterally overlap a major circumferential portion (e.g., ~65-95%) of the respective seal shoe 54.

During operation of the primary seal device 40 of FIG. 1, rotation of the rotating structure 26 may develop aerodynamic forces and apply a fluid pressure to the seal shoes 54 causing each seal shoe 54 to respectively move radially relative to the seal land surface 38. The fluid velocity may increase as a gap between a respective seal shoe 54 and the seal land surface 38 increases, thus reducing pressure in the gap and drawing the seal shoe 54 radially inwardly toward the seal land surface 38. As the gap closes, the velocity may decrease and the pressure may increase within the gap, thus, forcing the seal shoe 54 radially outwardly from the seal land surface 38. The respective spring element 56 and its spring beams 110 may deflect and move with the seal shoe 54 to enable provision of a primary seal of the gap between the seal land surface 38 and seal shoe protrusions 78 within predetermined design tolerances.

Figure 7A:
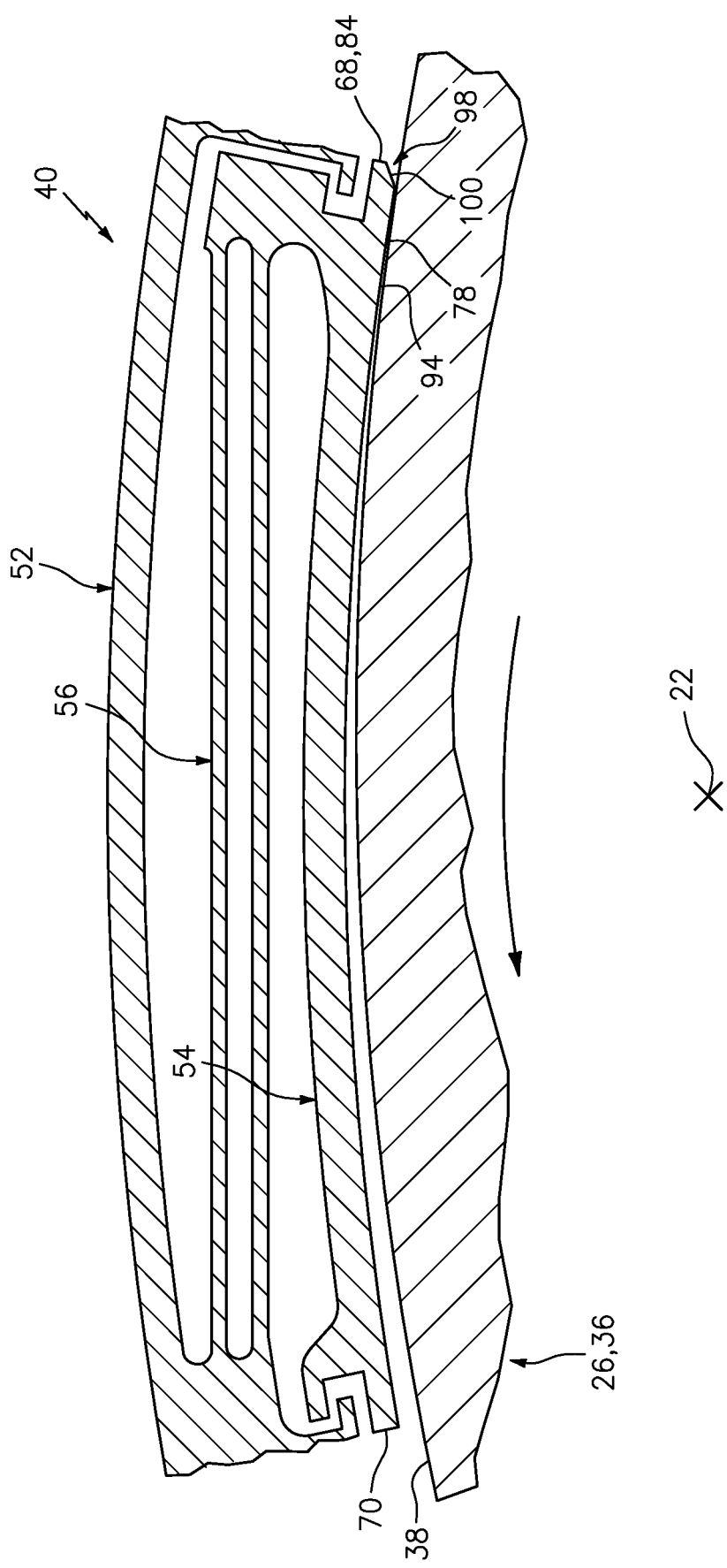
FIG. 7A is a partial sectional illustration of the primary seal device section arranged with a rotating structure.
Figure 7B:
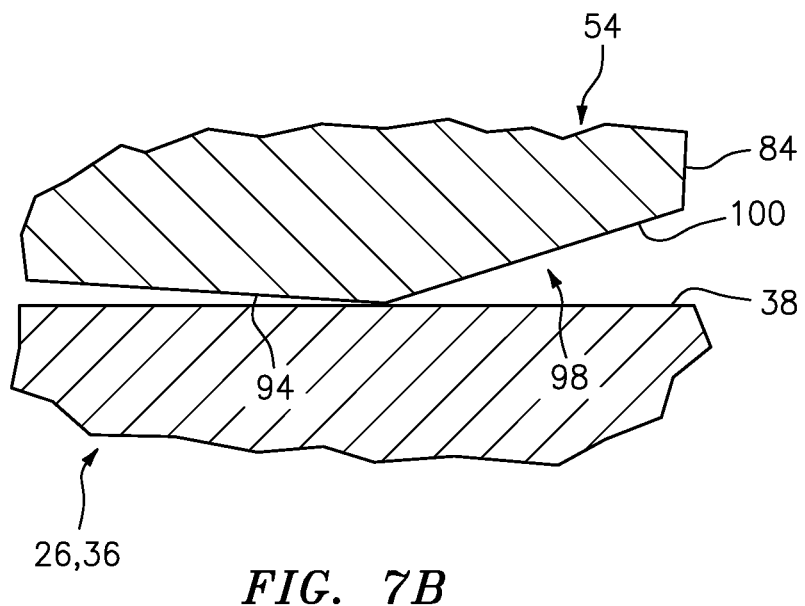
FIG. 7B is a close up illustration of an engagement between the primary seal device section and the rotating structure of FIG. 7A.
Figure 8:
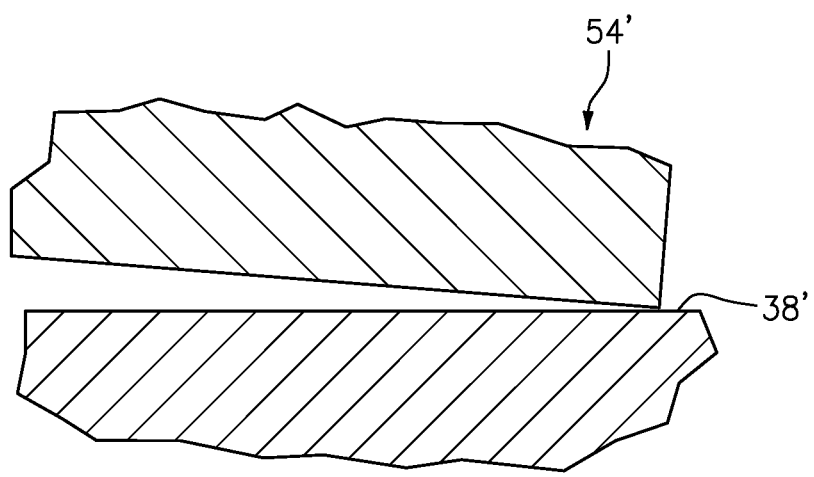
FIG. 8 is a side sectional illustration of engagement between another seal device and another rotating structure.

Referring to FIG. 7A, under certain conditions, one or more or each of the seal shoes 54 may be skewed. In particular, a radial distance between the seal shoe 54 and the seal land surface 38 at the base first end 68 may be different (e.g., less or greater) than a radial distance between the seal shoe 54 and the seal land surface 38 at the base second end 70. Such skew may lead to contact between the seal shoe 54 and the seal land surface 38. However, negative effects of such contact may be mitigated by the provision of the chamfered corner 98. In particular, the chamfered corner 98 provides a ramped/eased contact between the seal shoe 54 and the seal land surface 38; see FIG. 7B. By contrast, if the chamfered corner 98 was omitted as shown in FIG. 8, a seal shoe 54' may engage a seal land surface 38' via a chisel contact. Such a chisel contact is more likely to wear the seal land surface 38' than the ramped/eased contact of FIG. 7A.

Referring again to FIG. 1, while the primary seal device 40 described above is operable to generally seal the annular gap 30 between the stationary structure 24 and the rotating structure 26, fluid (e.g., gas) may still flow axially through passages 112 defined by the radial air gaps between the elements 52, 54 and 110. The secondary seal devices 42 therefore are provided to seal off these passages 112 and, thereby, further and more completely seal the annular gap 30.

Each of the secondary seal devices 42 may be configured as a ring seal element such as, but not limited to, a split ring. Alternatively, one or more of the secondary seal devices 42 may be configured as a full hoop body ring, an annular brush seal or any other suitable ring-type seal.

The secondary seal devices 42 of FIG. 1 are arranged together in an axial stack. In this stack, each of the secondary seal devices 42 axially engages (e.g., contacts) another adjacent one of the secondary seal devices 42. The stack of the secondary seal devices 42 is arranged with the first ring structure 44, which positions and mounts the secondary seal devices 42 with the stationary structure 24 adjacent the primary seal device 40. In this arrangement, the stack of the secondary seal devices 42 is operable to axially engage and form a seal between the side surface 90 of the array of the seal shoes 54 and an annular surface 114 of the first ring structure 44. These surfaces 90 and 114 are axially aligned with one another, which enables the stack of the secondary seal devices 42 to slide radially against, but maintain sealingly engagement with, the side surface 90 as the seal shoes 54 move radially relative to the seal land surface 38 as described above.

The first ring structure 44 may include a secondary seal device support ring 116 and a retention ring 118. The support ring 116 is configured with an annular full hoop body, which extends circumferentially around the axial centerline 22. The support ring 116 includes the annular surface 114, and is disposed axially adjacent and engaged with the seal base 52.

The retention ring 118 is configured with an annular full hoop body, which extends circumferentially around the axial centerline 22. The retention ring 118 is disposed axially adjacent and engaged with the support ring 116, thereby capturing the stack of the secondary seal devices 42 within an annular channel formed between the rings 116 and 118. The stack of the secondary seal devices 42, of course, may also or alternatively be attached to one of the rings 116, 118 by, for example, a press fit connection and/or otherwise.

Figure 9:
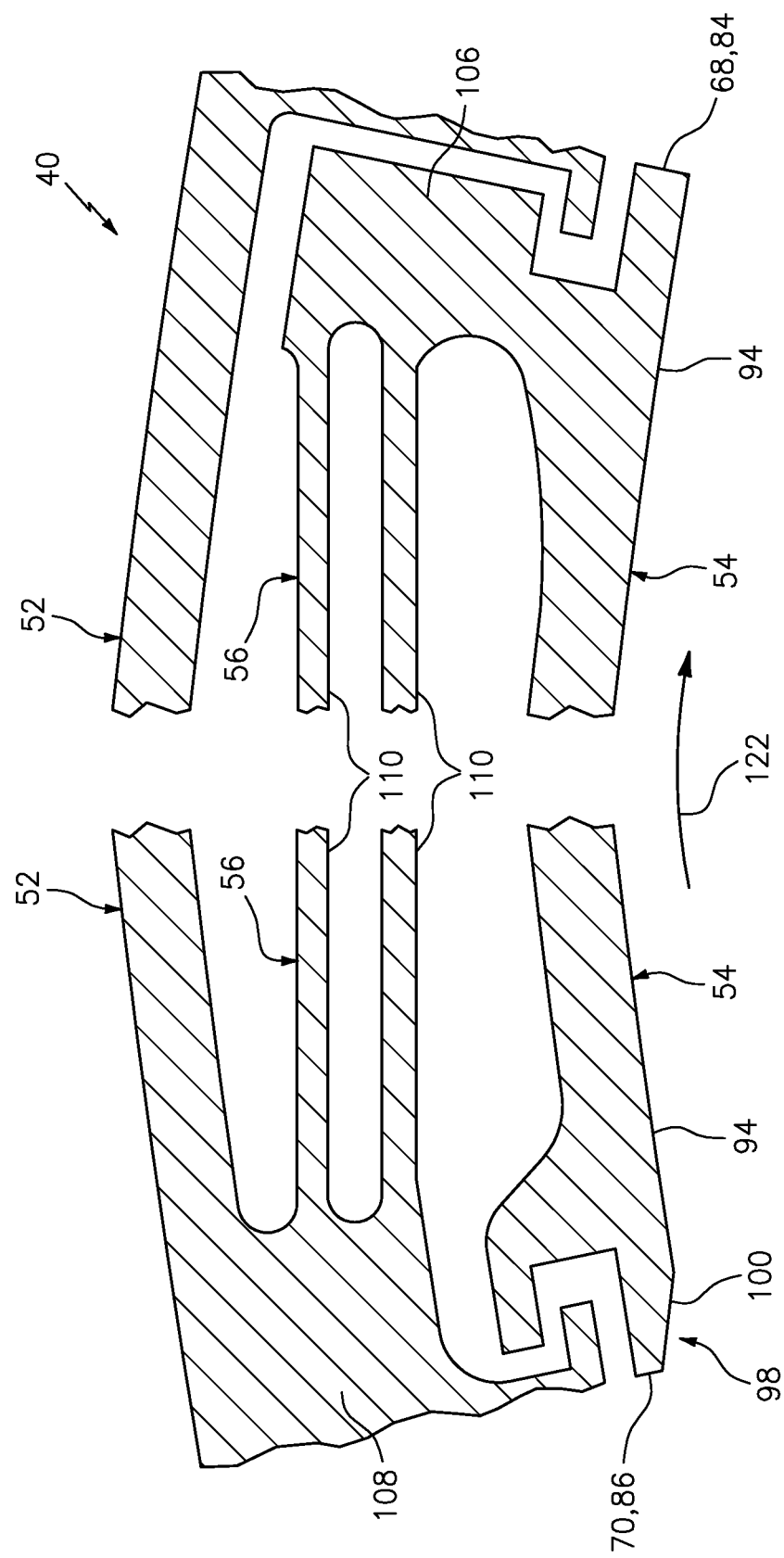
FIG. 9 is a partial segmented sectional illustration of another primary seal device section.
Figure 10:
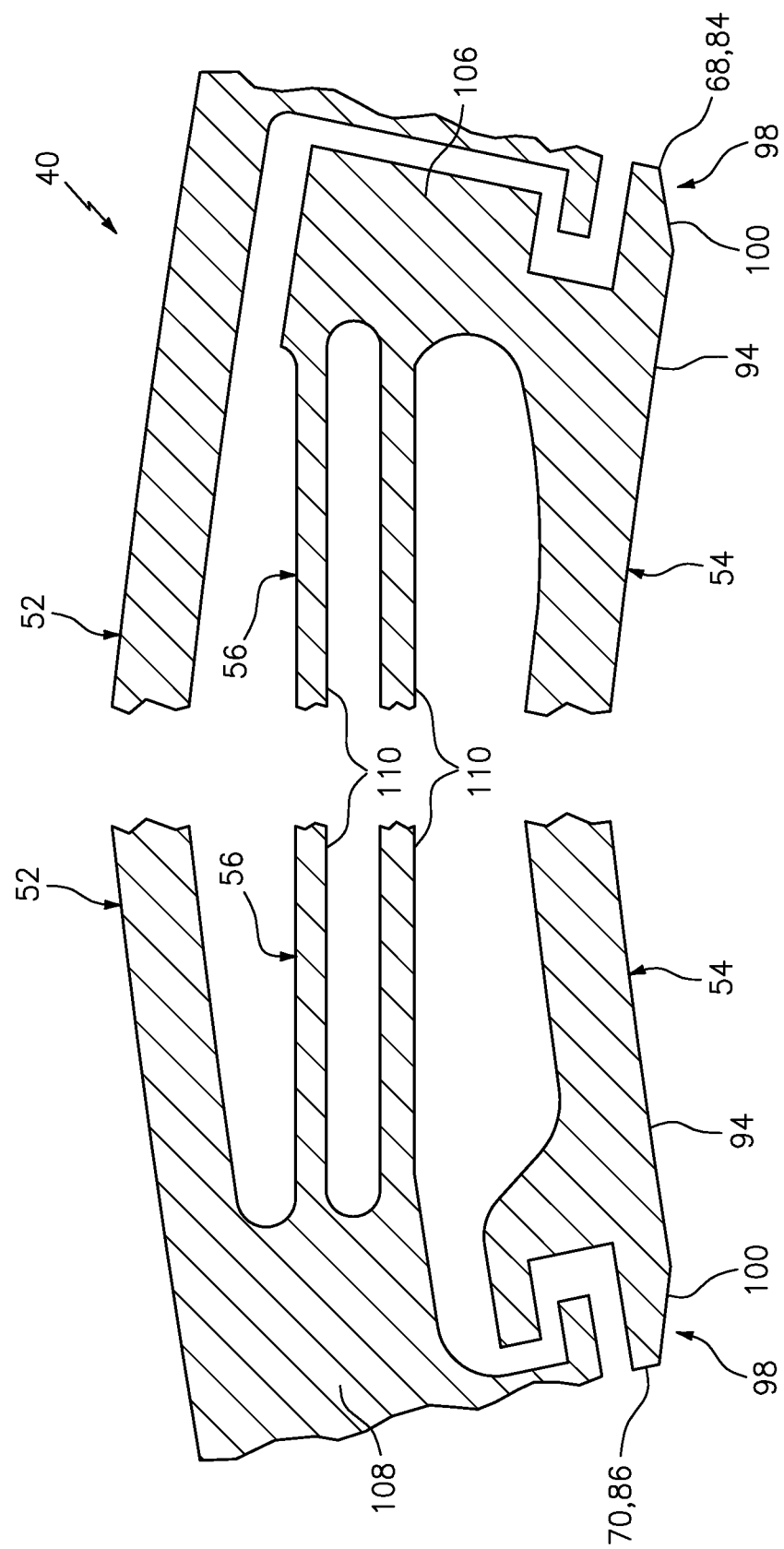
FIG. 10 is a partial segmented sectional illustration of still another primary seal device section.

The chamfered corner 98 of FIG. 5 is positioned at the base first end 68 because the rotating structure 26 rotates counter-clockwise about the axial centerline 22 (see arrow 120) when viewed in the plane of FIG. 5. However, referring to FIG. 9, the chamfered corner 98 may alternatively be positioned at the base second end 70 where the rotating structure 26 rotates clockwise about the axial centerline 22 (see arrow 122) when viewed in the plane of FIG. 9. In still other embodiments, referring to FIG. 10, each seal shoe 54 may be configured with a chamfered corner 98 at each base end 68 and 70.

Figure 11:
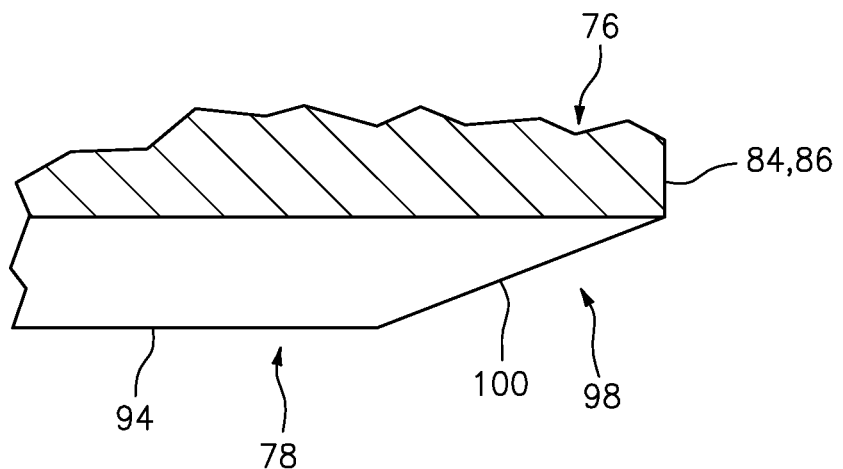
FIG. 11 is a sectional illustration of a portion of a seal shoe proximate a chamfered corner.
Figure 12:
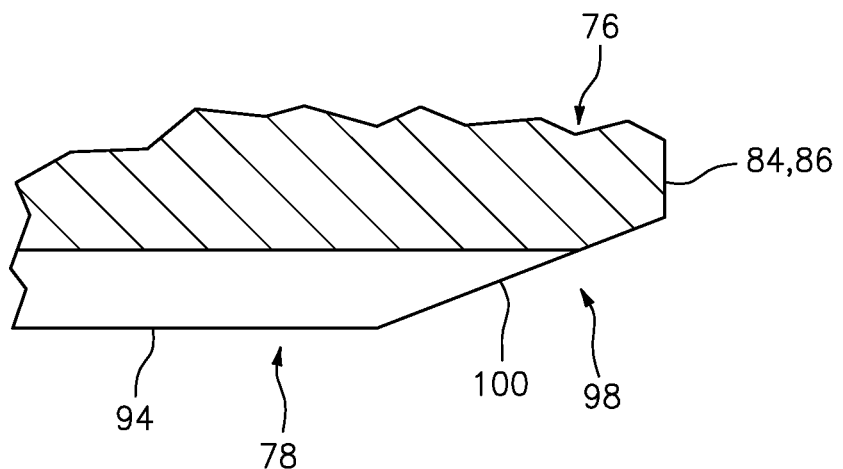
FIG. 12 is a sectional illustration of a portion of another seal shoe proximate a chamfered corner.
Figure 13:
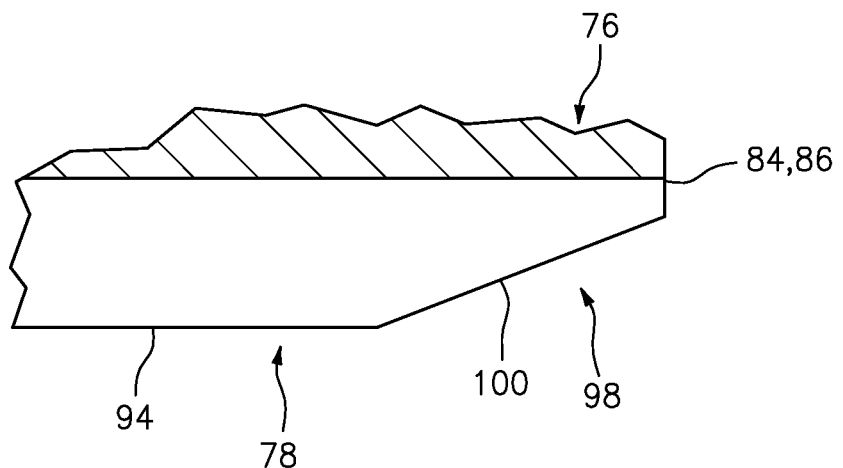
FIG. 13 is a sectional illustration of a portion of still another seal shoe proximate a chamfered corner.

Referring to FIG. 11, in some embodiments, an interface between the surfaces 100 and 84, 86 may be coincident with an interface between the seal shoe base 76 and the seal shoe protrusion(s) 78. However, in other embodiments, the interface between the surfaces 100 and 84, 86 may be radially outward of the interface between the seal shoe base 76 and the seal shoe protrusion(s) 78 as shown in FIG. 12; e.g., on the seal shoe base 76. In still other embodiments, the interface between the surfaces 100 and 84, 86 may be radially inward of the interface between the seal shoe base 76 and the seal shoe protrusion(s) 78 as shown in FIG. 13; e.g., on the seal shoe protrusion(s) 78.

The primary seal device 40 and its elements may be configured as a monolithic body. However, the present disclosure is not limited to such a primary seal device 40 constructions.

Figure 14:
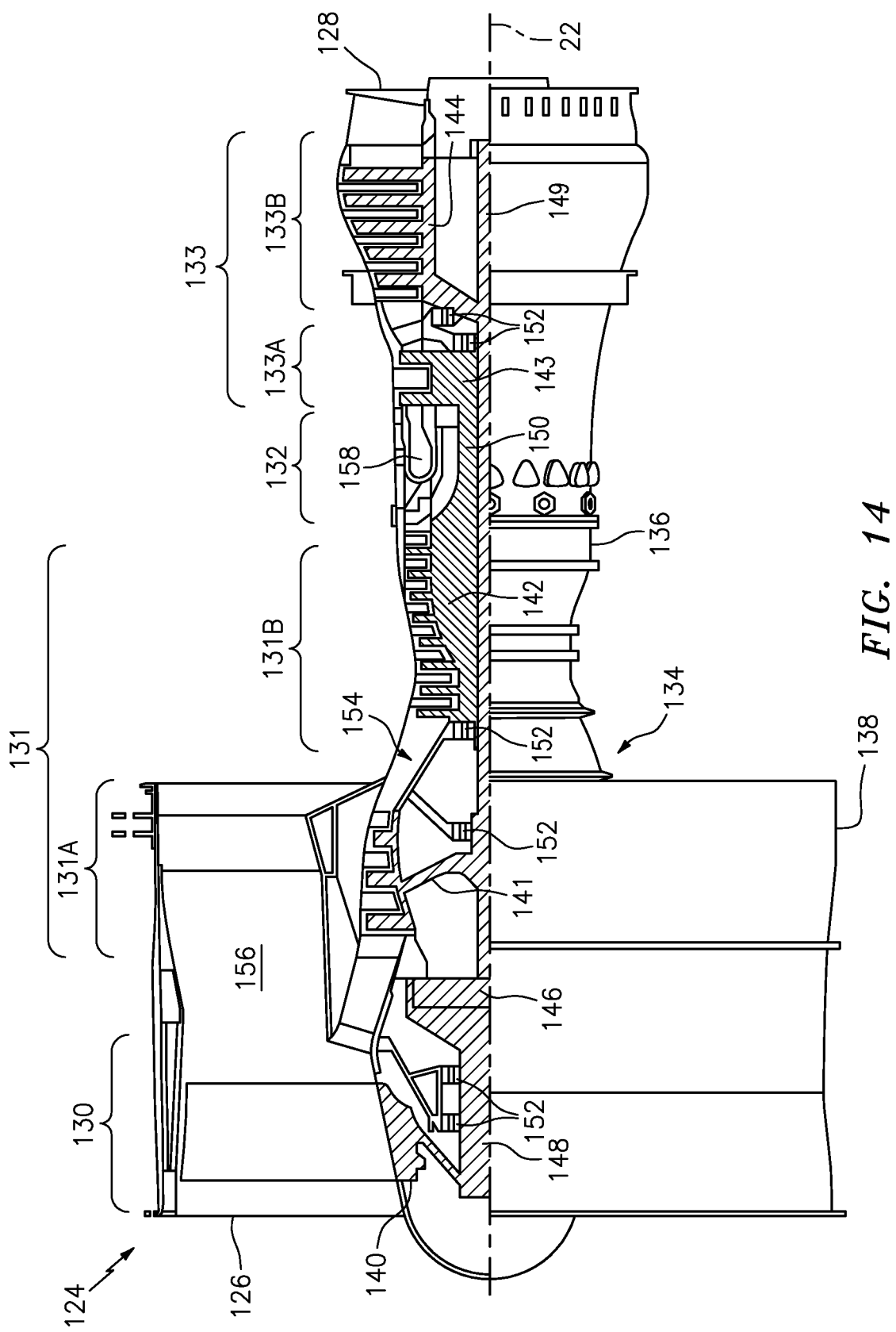
FIG. 14 is a side cutaway illustration of a geared turbine engine.

As described above, the assembly 20 of the present disclosure may be configured with various different types and configurations of rotational equipment. FIG. 14 illustrates one such type and configuration of the rotational equipment—a geared turbofan gas turbine engine 124. Such a turbine engine includes various stationary structures (e.g., bearing supports, hubs, cases, etc.) as well as various rotors (e.g., rotor disks, shafts, shaft assemblies, etc.) as described below, where the stationary structure 24 and the rotating structure 26 can respectively be configured as anyone of the foregoing structures in the turbine engine 124 of FIG. 14, or other structures not mentioned herein.

The turbine engine 124 of FIG. 14 extends along the axial centerline 22 between an upstream airflow inlet 126 and a downstream airflow exhaust 128. The turbine engine 124 includes a fan section 130, a compressor section 131, a combustor section 132 and a turbine section 133. The compressor section 131 includes a low pressure compressor (LPC) section 131A and a high pressure compressor (HPC) section 131B. The turbine section 133 includes a high pressure turbine (HPT) section 133A and a low pressure turbine (LPT) section 133B.

The engine sections 130-133B are arranged sequentially along the axial centerline 22 within an engine housing 134. This housing 134 includes an inner case 136 (e.g., a core case) and an outer case 138 (e.g., a fan case). The inner case 136 may house one or more of the engine sections 131A-133B; e.g., an engine core. The outer case 138 may house at least the fan section 130.

Each of the engine sections 130, 131A, 131B, 133A and 133B includes a respective rotor 140-144. Each of these rotors 140-144 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 140 is connected to a gear train 146, for example, through a fan shaft 148. The gear train 146 and the LPC rotor 141 are connected to and driven by the LPT rotor 144 through a low speed shaft 149. The HPC rotor 142 is connected to and driven by the HPT rotor 143 through a high speed shaft 150. The shafts 148-150 are rotatably supported by a plurality of bearings 152. Each of these bearings 152 is connected to the engine housing 134 by at least one stationary structure such as, for example, an annular support strut.

During operation, air enters the turbine engine 124 through the airflow inlet 126. This air is directed through the fan section 130 and into a core gas path 154 and a bypass gas path 156. The core gas path 154 extends sequentially through the engine sections 131A-133B. The air within the core gas path 154 may be referred to as "core air". The bypass gas path 156 extends through a bypass duct, which bypasses the engine core. The air within the bypass gas path 156 may be referred to as "bypass air".

The core air is compressed by the compressor rotors 141 and 142 and directed into a combustion chamber 158 of a combustor in the combustor section 132. Fuel is injected into the combustion chamber 158 and mixed with the compressed core air to provide a fuel-air mixture. This fuel air mixture is ignited and combustion products thereof flow through and sequentially cause the turbine rotors 143 and 144 to rotate. The rotation of the turbine rotors 143 and 144 respectively drive rotation of the compressor rotors 142 and 141 and, thus, compression of the air received from a core airflow inlet. The rotation of the turbine rotor 144 also drives rotation of the fan rotor 140, which propels bypass air through and out of the bypass gas path 156. The propulsion of the bypass air may account for a majority of thrust generated by the turbine engine 124, e.g., more than seventy-five percent (75%) of engine thrust. The turbine engine 124 of the present disclosure, however, is not limited to the foregoing exemplary thrust ratio.

The assembly 20 may be included in various turbine engines other than the one described above as well as in other types of rotational equipment. The assembly 20, for example, may be included in a geared turbine engine where a gear train connects one or more shafts to one or more rotors in a fan section, a compressor section and/or any other engine section. Alternatively, the assembly 20 may be included in a turbine engine configured without a gear train. The assembly 20 may be included in a geared or non-geared turbine engine configured with a single spool, with two spools (e.g., see FIG. 14), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines or rotational equipment.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for rotational equipment, comprising:
   a plurality of seal shoes arranged around an axis in an annular array, the plurality of seal shoes comprising a first seal shoe;
   a seal base circumscribing the annular array of seal shoes; and
   a plurality of spring elements comprising a first spring element, the first spring element radially between and connecting the first seal shoe and the seal base;
   the first seal shoe extending circumferentially about the axis between a circumferential first end and a circumferential second end, and the first seal shoe extending radially between an inner side and an outer side;
   wherein the first seal shoe is configured with a first chamfered corner at the circumferential first end and the inner side, the first chamfered corner comprises a first corner surface, the first corner surface is angularly offset from an inner surface of the first seal shoe at the inner side by a first included angle when viewed in a plane perpendicular to the axis, and the first included angle is an obtuse angle; and
   wherein a second surface of the first seal shoe disposed at the circumferential second end is contiguous with the inner surface, the second surface is angularly offset from the inner surface by an excluded angle when viewed in the plane perpendicular to the axis, and the excluded angle is different than the first included angle.

2. The assembly of claim 1, wherein the inner surface has an arcuate sectional geometry.

3. The assembly of claim 1, wherein the first included angle is an obtuse included angle.

4. The assembly of claim 1, wherein the first included angle is equal to or greater than one hundred and thirty-five degrees and is less than one hundred and eighty degrees.

5. The assembly of claim 1, wherein the first corner surface is angularly offset from an end surface of the first seal shoe at the circumferential first end by a third angle when viewed in the plane perpendicular to the axis.

6. The assembly of claim 5, wherein the end surface has a straight sectional geometry.

7. The assembly of claim 5, wherein the third angle is an obtuse included angle.

8. The assembly of claim 1, wherein
the first seal shoe includes a base and a plurality of rails arranged in parallel at discrete axial locations along the axis;
each of the plurality of rails projects radially inwards from the base to the inner side; and
the chamfered corner is formed by one or more of the plurality of rails.

9. The assembly of claim 1, further comprising:
a rotating structure configured to rotate counter-clockwise about the axis when viewed in in a plane perpendicular to the axis;
wherein, when viewed in the plane, the circumferential first end is a left side end of the first seal shoe and the circumferential second end is a right side end of the first seal shoe.

10. An assembly for rotational equipment, comprising:
a plurality of seal shoes arranged around an axis in an annular array, the plurality of seal shoes comprising a first seal shoe;
a seal base circumscribing the annular array of seal shoes; and
a plurality of spring elements comprising a first spring element, the first spring element radially between and connecting the first seal shoe and the seal base;
the first seal shoe extending circumferentially about the axis between a circumferential first end and a circumferential second end, and the first seal shoe extending radially between an inner side and an outer side;
wherein the first seal shoe is configured with a first chamfered corner at the circumferential first end and the inner side, the first chamfered corner comprises a first corner surface, and the first corner surface is angularly offset from an inner surface of the first seal shoe at the inner side by a first obtuse included angle when viewed in a plane perpendicular to the axis; and
wherein the first seal shoe is configured with a second chamfered corner at the circumferential second end and the inner side, the second chamfered corner comprises a second corner surface, and the second corner surface is angularly offset from the inner surface at the inner side by a second obtuse included angle when viewed in the plane perpendicular to the axis.

11. The assembly of claim 1, wherein
the first spring element includes a first mount, a second mount and a spring beam;
the first mount is connected to and projects radially outward from the first seal shoe;
the second mount is connected to and projects radially inward from the seal base; and
the spring beam extends laterally between and is connected to the first mount and the second mount.

12. The assembly of claim 11, wherein the first mount is disposed at the circumferential first end of the first seal shoe.

13. The assembly of claim 11, wherein the first mount is disposed at the circumferential second end of the first seal shoe.

14. The assembly of claim 11, wherein the first spring element further includes a second spring beam extending laterally between and connected to the first mount and the second mount.

15. The assembly of claim 1, further comprising a non-contact seal assembly including the plurality of seal shoes, the seal base and the plurality of spring elements.

16. The assembly of claim 1, further comprising:
a stationary structure;
a rotating structure configured to rotate about the axis; and
a seal assembly including the plurality of seal shoes, the seal base and the plurality of spring elements, the seal assembly configured to seal a gap between the stationary structure and the rotating structure;
wherein the plurality of seal shoes are arranged circumferentially about and sealingly engage the rotating structure; and
wherein the seal base is mounted to the stationary structure.

17. An assembly for rotational equipment, comprising:
a plurality of seal shoes arranged around an axis and comprising a first seal shoe;
a seal base extending circumferentially around the plurality of seal shoes; and
a plurality of spring elements comprising a first spring element, the first spring element radially between and engaged with the first seal shoe and the seal base;
the first seal shoe including a circumferential first end surface, a circumferential second end surface, an inner surface, an outer surface and a corner surface;
the first seal shoe extending circumferentially about the axis between the circumferential first end surface and the circumferential second end surface;
the first seal shoe extending radially between the inner surface and the outer surface, wherein the first seal shoe circumferentially tapers as the first seal shoe extends radially to the inner surface; and
the corner surface extending between the inner surface and the circumferential first end surface.

18. The assembly of claim 17, wherein
the corner surface is angularly offset from the inner surface by an obtuse included angle; and
the corner surface at least partially forms a chamfered corner of the first seal shoe.

19. The assembly of claim 1, wherein
the first included angle is equal to or greater than one hundred and thirty-five degrees and is less than one hundred and eighty degrees; and
the excluded angle is between eighty-five degrees and ninety-five degrees.

20. The assembly of claim 1, wherein
the first included angle is an obtuse angle; and
the excluded angle is an acute angle.

* * * * *